United States Patent [19]

Weise et al.

[11] Patent Number: 5,105,546

[45] Date of Patent: Apr. 21, 1992

[54] APPARATUS AND METHOD FOR CENTERING A VEHICLE STEERING WHEEL

[75] Inventors: Kenneth A. Weise, Dearborn; Daniel W. Lavey, Dearborn Heights, both of Mich.

[73] Assignee: Ford Motor Company, Dearborn, Mich.

[21] Appl. No.: 649,645

[22] Filed: Feb. 1, 1991

[51] Int. Cl.⁵ .......................... G01B 7/30; G01B 7/315
[52] U.S. Cl. ..................... 33/203.12; 33/371; 33/600; 33/203.13
[58] Field of Search ................. 33/203, 203.12, 203.13, 33/600, 644, 520, 370, 371; 73/117, 118.1; 116/31; 356/155

[56] References Cited

U.S. PATENT DOCUMENTS

| | | |
|---|---|---|
| 2,598,599 | 5/1952 | Pleasance . |
| 3,337,961 | 8/1967 | Holub .................... 33/203.18 |
| 3,453,740 | 7/1969 | Sakamoto . |
| 3,465,577 | 9/1969 | Donovan .................... 73/117 |
| 3,813,932 | 6/1974 | Wallace .................... 73/118.1 |
| 3,889,527 | 6/1975 | Wallace .................... 33/203 |
| 4,095,902 | 6/1978 | Florer et al. .................... 356/155 |
| 4,393,694 | 7/1983 | Marten et al. .................... 33/203.13 |
| 4,399,766 | 8/1983 | Lenberg .................... 116/31 |
| 4,416,065 | 11/1983 | Hunter .................... 33/600 |
| 4,697,327 | 7/1987 | Fouchey et al. .................... 33/203.13 |
| 4,893,413 | 1/1990 | Merrill et al. .................... 33/371 |
| 4,901,560 | 2/1990 | Hirano et al. . |
| 4,962,664 | 10/1990 | Hirano et al. . |
| 5,040,303 | 8/1991 | Koerner .................... 33/203 |

Primary Examiner—Thomas B. Will
Attorney, Agent, or Firm—Raymond L. Coppiellie; Roger L. May

[57] ABSTRACT

An apparatus for centering a vehicle steering wheel is disclosed comprising a steering wheel angle measuring tool which measures the instantaneous position of an unfixtured steering wheel from a vertical axis of the steering wheel. The apparatus further includes a toe angle measuring unit which continuously measures the toe angle of the vehicle and a processor which dynamically determines a desired toe angle based upon the instantaneous position of the steering wheel and the measured toe angle. The vehicle steering wheel rotates freely throughout the process of the present invention. A method for centering a vehicle steering wheel is also disclosed.

19 Claims, 3 Drawing Sheets

APPARATUS AND METHOD FOR CENTERING A VEHICLE STEERING WHEEL

BACKGROUND OF THE INVENTION

1. Field of the Invention

The present invention relates generally to an apparatus for centering a vehicle steering wheel with respect to a vertical axis of the steering wheel More particularly, the present invention relates to an apparatus and method for centering the vehicle steering wheel as the steering wheel rotates freely with respect to the vehicle body.

2. Disclosure Information

When the roadwheels of a vehicle are in a straight ahead position, the vehicle steering wheel should be in a central neutral position allowing the vehicle operator a clear view of the instrument panel. This position, also known as the clear vision position, refers to a position of a spoke of the steering wheel to an imaginary vertical axis of the steering wheel. Typically, because of compliance in the vehicle steering system due to the connections of the steering shaft to the steering gear, the steering gear to the tie rods and the tie rods to the vehicle wheels, vehicle manufacturers specify a preselected tolerance about the vertical axis that the steering wheel can move and still be within a clear vision position. This tolerance and the position of the steering wheel with respect to its vertical axis define a relationship with the position of the vehicle roadwheels. Specifically, this relationship corresponds to a predetermined toe angle of the vehicle roadwheels. Typically, in a steering wheel having a single spoke extending laterally across the diameter of the steering wheel, the clear vision position is that position wherein the spoke lies generally Perpendicular to the vertical axis of the steering wheel and the roadwheels are in the straight ahead position.

As stated above, it is desirable to position the steering wheel in its clear vision position when the wheels are in the straight ahead position so that the vehicle operator's view of the instrument panel is unobstructed when the vehicle is traveling straight. Furthermore, if the steering wheel is not in its clear vision position, later operation of the vehicle with the steering wheel in a centered position will cause the vehicle to turn because the wheels are not in the straight ahead position.

Various devices have been proposed for positioning the steering wheel in a clear vision position during alignment of the vehicle roadwheels. For example, U.S. Pat. No. 4,893,413 and the devices described therein, as well as U.S. Pat. Nos. 4,679,327 and 2,598,599 disclose steering wheel centering apparatuses wherein the steering wheel is locked into the clear vision position before alignment of the vehicles is begun. The '327 patent discloses the use of an inclinometer to set the steering wheel to a desired position before alignment of the vehicle wheels is begun. These devices suffer from the disadvantage that during the straightening of the roadwheels with the steering wheel locked in position, compliance in the steering system increases, resulting in a potentially large degree of offset of the steering wheel from the centered position after the steering wheel is unlocked and the vehicle begins to move. Therefore, there is a need to reduce the compliance buildup of the steering system while the steering wheel is positioned to achieve clear vision.

U S. Pat. No. 4,393,694 discloses a system wherein a torque wrench is attached to the steering wheel and torque is measured in each steering direction. From these two steps, front end alignment defects can be determined. However, the steering wheel cannot be set to a clear vision position accurately with this system.

U.S. Pat. No. 3,889,527 discloses a system which measures the angular rotation of the steering wheel to determine the amount of compliance in the suspension system. The system is not used to set the steering wheel to a clear vision position.

It is a feature of the present invention to provide an apparatus which positions the vehicle steering wheel to correspond to the position of the vehicle roadwheels.

It is a further feature of the present invention to provide an apparatus which aligns the vehicle roadwheels to a predetermined toe angle corresponding to the instantaneous position of an unfixtured steering wheel so that the steering wheel is in a clear vision position when the roadwheels are in a straight ahead position.

It is an advantage of the present invention to provide an apparatus which eliminates steering system compliance buildup during the alignment process.

It is a further advantage of the present invention that the steering wheel may be set to a clear vision position more accurately than with prior art systems.

These and other objects, features and advantages of the present invention will become apparent from the summary, detailed description and claims which follow.

SUMMARY OF THE INVENTION

There is disclosed herein an apparatus for positioning a steering wheel of a vehicle having a chassis and a set of roadwheels to within a preselected tolerance of a predetermined relationship of a spoke of the steering wheel to a vertical axis of the steering wheel. The predetermined relationship corresponds to a predetermined toe angle of the set of roadwheels. The apparatus comprises a steering wheel angle measuring means for measuring a deviation in the position of the steering wheel from the predetermined relationship and for generating a first signal corresponding to the deviation, the means being operative to rotate freely with respect to the vehicle chassis during measurement of the deviation. In one embodiment, the apparatus further comprises toe angle measuring means for continuously measuring the position of the toe angle of the roadwheels of the vehicle and for generating a second signal corresponding to the toe angle measurement as well as processor means associated with the steering wheel angle measuring means and the toe angle measuring means. The processor means receives the first and second signals and dynamically determines a desired toe angle of the roadwheels based upon the measured steering wheel deviation. The processor means further generates a third signal when the measured toe angle corresponds to the desired toe angle.

There is further disclosed a method of positioning a steering wheel of a vehicle having a chassis and a set of roadwheels to within a preselected tolerance of a central neutral position corresponding to a predetermined toe angle of the set of roadwheels. The method comprises the steps of: (a) continuously measuring a deviation in the position of the steering wheel from a vertical axis of the steering wheel as the steering wheel rotates freely with respect to the vehicle chassis and generating a first signal corresponding to the deviation; (b) continuously measuring the position of the toe angle of the roadwheels of the vehicle and generating a second signal corresponding to the toe angle measurement; (c) dynamically determining a desired toe angle of the roadwheels of the vehicle based upon the first and second signals and generating a third signal when the measured toe angle corresponds to the desired toe angle; and (d) fixing the toe angle of the set of vehicle roadwheels upon generation of the third signal.

There is also disclosed herein an apparatus for aligning a set of roadwheels of a vehicle having a chassis and a steering wheel to within a preselected tolerance of the instantaneous position of the steering wheel. The apparatus comprises first means for measuring the instantaneous position of a spoke of the steering wheel to a vertical axis of the steering wheel and for generating a first signal corresponding to this position. The first means rotates freely with respect to the vehicle chassis during the measuring of the steering wheel position. The apparatus further comprises toe angle measuring means for continuously measuring the position of the toe angle of the roadwheels of the vehicle and for generating a second signal corresponding to the toe angle measurement. The apparatus also includes processor means operatively associated with the first means and the toe angle measuring means for receiving the first and second signals and for dynamically determining a desired toe angle of the roadwheels of the vehicle based upon the instantaneous steering wheel position and for generating a third signal when the measured toe angle corresponds to the desired toe angle so that the instantaneous position of the steering wheel corresponds to the measured instantaneous toe angle of the roadwheels of the vehicle.

There is further disclosed herein a method of aligning a set of roadwheels of a vehicle having a chassis and a steering wheel operative to rotate freely with respect to the chassis to within a preselected tolerance of an instantaneous position of a spoke of the steering wheel. The method comprises the steps of: (a) continuously measuring the instantaneous position of the steering wheel as the steering wheel rotates freely with respect to the vehicle chassis and generating a first signal corresponding to the position; (b) continuously measuring the position of the toe angle of the roadwheels of the vehicle and generating a second signal corresponding to the toe angle measurement; (c) dynamically determining a desired toe angle of the roadwheels of the vehicle based upon the first and second signals and generating a third signal when the measured toe angle corresponds to the desired toe angle; and (d) fixing the toe angle of the set of vehicle roadwheels upon generation of the third signal.

DETAILED DESCRIPTION OF THE PREFERRED EMBODIMENTS

Figure 1:
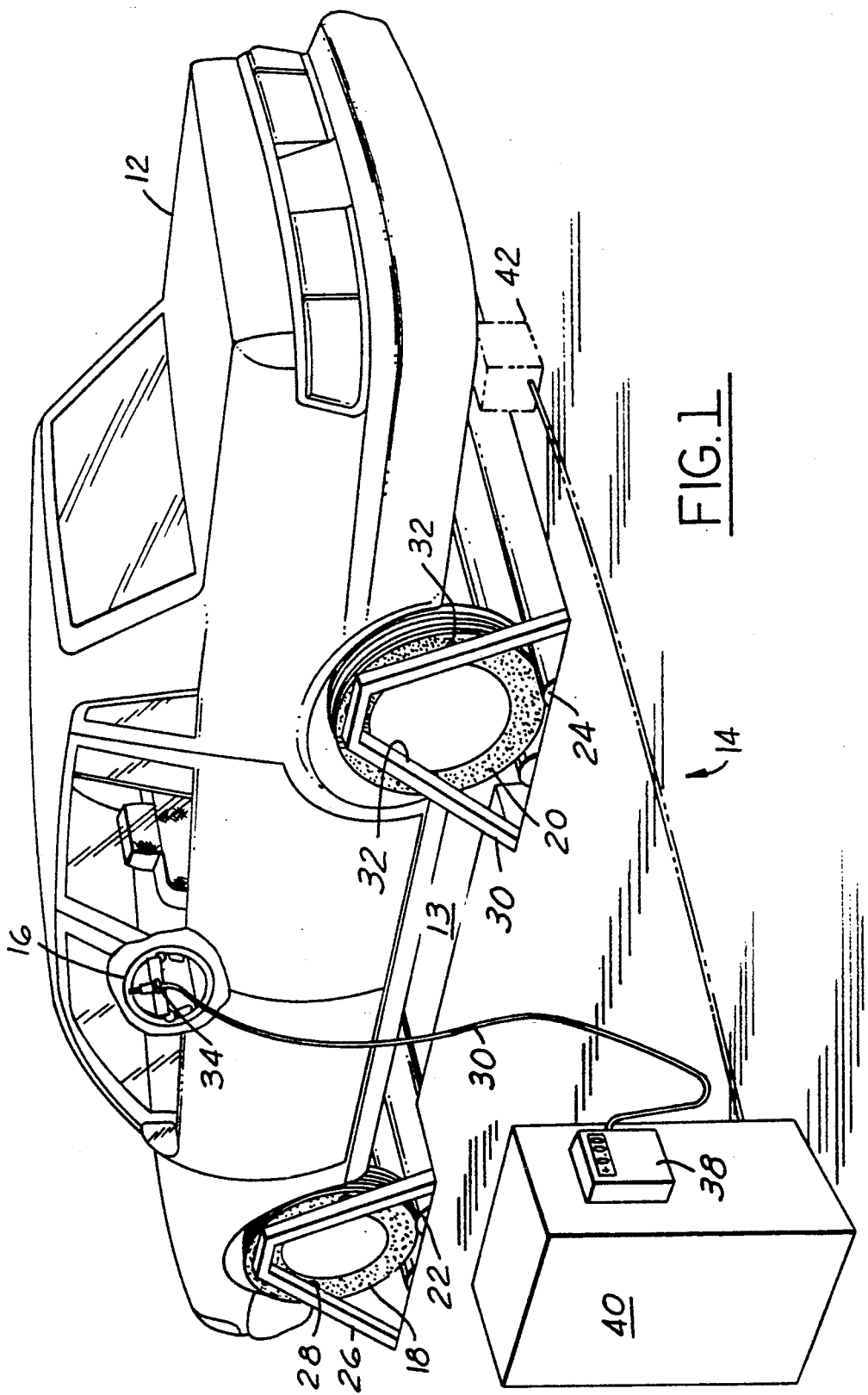
FIG. 1 is a perspective view of an apparatus structured in accord with the principles of the present invention.

Referring now to the drawings, FIG. 1 shows a vehicle 12 positioned in an apparatus of the present invention. The vehicle 12 is located above a garage pit 13 wherein an operator can make adjustments to the vehicle easily. The vehicle 12 includes a steering wheel 16, a front set of roadwheels 18 and a rear set of roadwheels 20. The vehicle 12 further includes a steering shaft, steering gear and a pair of tie rods, all cooperating in a known manner to connect the steering wheel 16 to the front vehicle roadwheels. For ease of description, only the left side of the vehicle is shown, it being understood that the right side of the vehicle 16 and the apparatus of the present invention are similarly structured.

As further seen in FIG. 1, the apparatus of the present invention further includes a wheel alignment unit 14, such as a "runout compensation static wheel alignment tester" manufactured by the Anzen Motor Car Company, Ltd. and as disclosed in U.S. Pat. Nos. 3,453,740; 4,962,664; and 4,901,560, the disclosures of which are herein incorporated by reference. However, other types of known wheel alignment units may be utilized as well, it being understood that the present invention is not meant to be limited solely to the wheel alignment unit described herein. The wheel alignment unit 14 is a means for measuring continuously the toe angle of the vehicle roadwheels 18, 20 and includes a front set of rollers 22 and a rear set of rollers 24. Interposed between each roller of each set 22, 24 is a transducer which measures the angular deviation of the wheels from a longitudinal center line on the vehicle, more commonly known as toe angle of the roadwheels.

The wheel alignment unit 14 further includes a front wheel runout measurement tool 26 and a rear wheel runout measurement tool 30. Each of the runout measurement tools 26, 30, includes a plurality of rollers 28, 32, respectively, which include transducers which bear against the sidewalls of the vehicle roadwheels. Although FIG. 1 shows only the outer runout tools, the wheel alignment unit 14 includes inner runout measurement tools placed against the inner sidewalls of the vehicle roadwheels. The inner and outer runout measurement tools comprise means for measuring the wheel runout of the vehicle. Each of the transducers of the wheel alignment unit 14, including the transducers which measure the toe angle of the vehicle roadwheels and the wheel runout transducers 28, 32, generate signals sent to a processor 40 where the information is stored as will be described hereinbelow. It should be readily apparent to one of ordinary skill in the art that the present invention may be utilized with other types of wheel alignment units, even those incapable of measuring wheel runout. The apparatus of the present invention may be utilized without a wheel runout measurement by approximating runout according to known practices.

The apparatus of the present invention further includes a steering wheel angle measuring tool 34 connected to the steering wheel 16 of the vehicle. The steering wheel angle measuring tool 34 communicates with display unit 38 operatively associated with processor 40 through cable 36. The wheel alignment unit 14 also includes a second display unit 42 (shown in phantom) located in the pit below the vehicle which the operator in the pit can see. The display unit 42 is also connected to the processor 40. As will be described in greater detail below, the steering wheel angle measuring tool 34 generates a continuous signal to the processor corresponding to the instantaneous position of the steering wheel with respect to a vertical axis of the steering wheel. As such, the tool 34 comprises means for measuring a deviation in the position of the steering wheel from a central neutral position corresponding to a predetermined toe angle of the roadwheels and for generating a signal corresponding to the deviation. As can be seen in FIG. 1, the tool 34 is fixed to the steering wheel which rotates freely with respect to the chassis of the vehicle during the alignment process.

Figure 2:
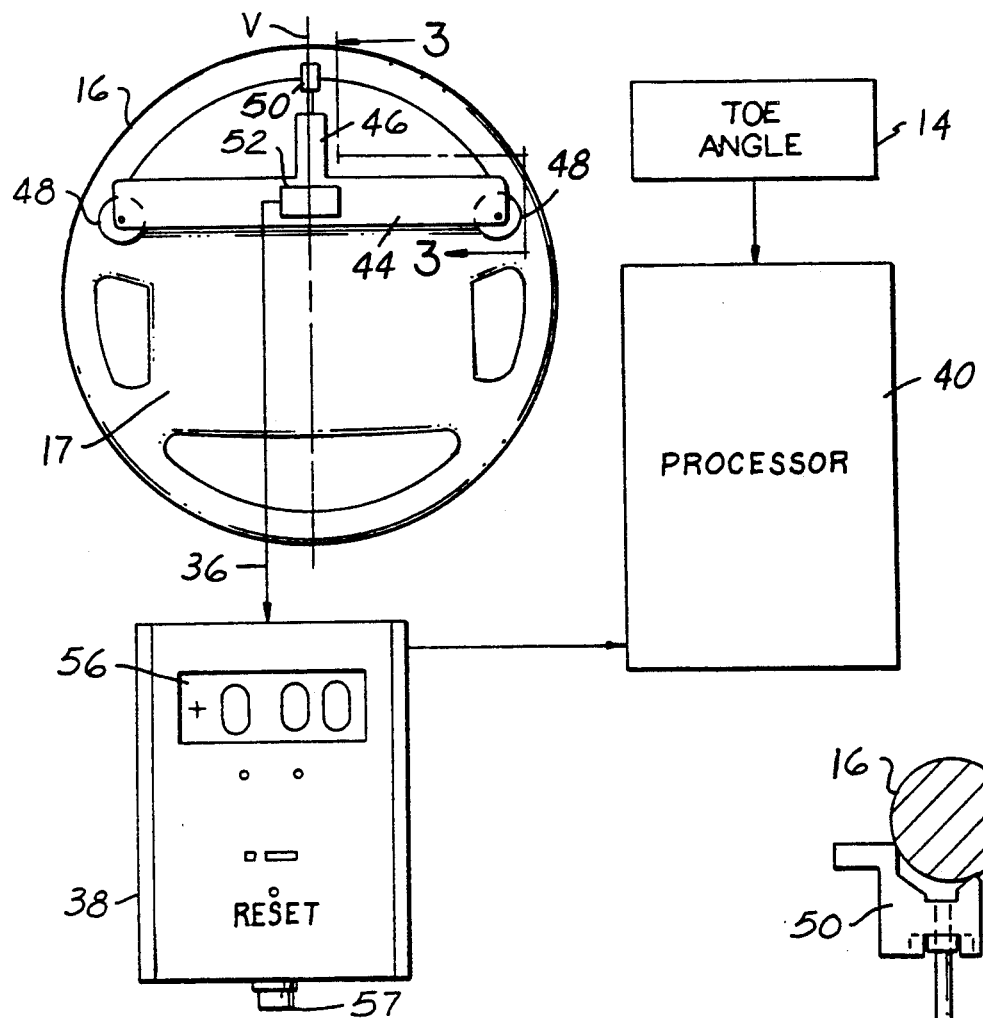
FIG. 2 is a schematic view of the component of the present invention.
Figure 3:
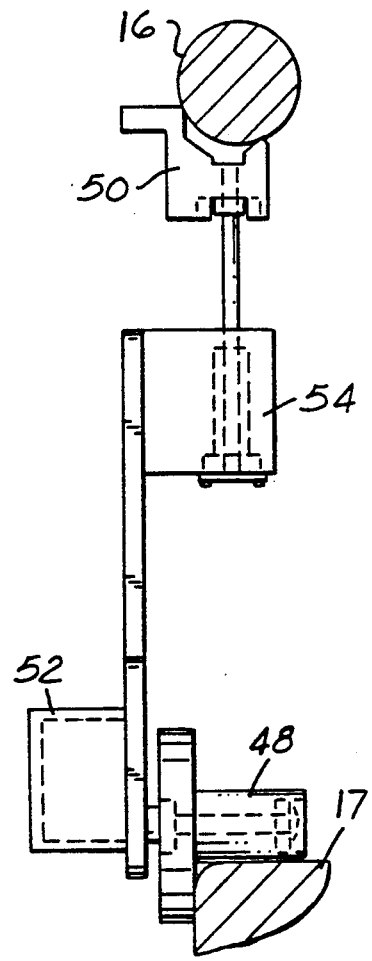
FIG. 3 is a side elevational view of a steering wheel angle measuring tool of FIG. 2 taken along line 3—3.

As shown in FIGS. 2 and 3, the steering wheel angle measuring tool 34 comprises a T-shaped member having a longitudinal arm 44 and a transverse arm 46. As illustrated, the longitudinal arm 44 of the tool extends across the inner diameter of the steering wheel 16 and rests upon a spoke 17 of the steering wheel. The longitudinal arm 44 includes a roller 48 disposed on each end thereof which rotates freely with respect to the longitudinal arm and eases the installation of the tool 34 into the steering wheel 16. The transverse member 46 of the tool 34 includes a plunger 50 biased by a spring member 54. The spring member 54 biases the plunger against the steering wheel 16 to secure the tool into the steering wheel 16. Although shown as a T-shaped member, it should be apparent to those skilled in the art that the steering wheel alignment tool 34 of the present invention may be structured in a variety of other configurations. The present invention is not meant to be limited solely to a steering wheel angle measuring tool having the illustrated T-shape. However, it is imperative that the steering wheel angle measuring tool of the present invention be allowed to rotate freely in conjunction with the rotation of the steering wheel with respect to the vehicle chassis during the alignment process.

The steering wheel angle measuring tool 34 further includes an inclinometer 52 disposed thereon. The inclinometer 52 is a level transducer which measures the angle the steering wheel deviates from a vertical axis of the steering wheel, V. The inclinometer may comprise any of a number of known electronic leveling tools such as level transducers or digital inclinometers. The inclinometer 52 generates a continuous analog voltage signal corresponding to the angular deviation of the steering wheel with respect to its vertical axis, V. The signal is sent through display unit 38 to processor 40.

The display unit 38 serves two purposes in the apparatus of the present invention. The display unit 38 first receives the signal from the tool 34 and converts that signal to be readable by the processor 40. As will be explained below, the display unit also displays the relative measurement of the steering wheel position to the toe angle position. For example, a reading of +0.00 as illustrated in FIG. 2 corresponds to the situation wherein the steering wheel position directly corresponds to the toe angle position of the vehicle roadwheels so that when the vehicle roadwheels are in a straight ahead position the steering wheel is in the central neutral, or clear vision position. The display unit shows actual measurement of the steering wheel position with respect to its vertical axis. As will be explained below, an operator of the apparatus of the present invention simply adjusts the toe angle of the vehicle roadwheels so that a zero reading is shown on the display unit 38 to correlate the steering wheel instantaneous position to the instantaneous position of the toe angle of the vehicle roadwheels.

The display unit 38 further includes a calibrate setting 57 as illustrated in FIG. 2. The calibrate setting 57 is utilized to calibrate the steering wheel angle measuring tool 34. The tool 34 may be calibrated in a known method wherein the tool is placed at predetermined, angularly spaced-apart positions which are recorded by the inclinometer. This calibration linearizes the voltage signal generated by the inclinometer to give accurate readings of the position of the steering wheel with respect to its vertical axis.

As described above, the wheel alignment unit 14 continuously measures the toe angle of the roadwheels and generates a signal corresponding to the measured toe angle to the processor 40. The processor receives the signal from the steering wheel angle measuring tool 34 and the measured toe angle from the wheel alignment unit 14 and uses these signals to dynamically determine a desired toe angle corresponding to the instantaneous position of the steering wheel and based, in part, upon vehicle manufacturer specifications and the measured steering wheel deviation as will be explained below. The processor 40 then generates a third signal to the display unit 38 to indicate the relative correspondence between the instantaneous toe angle measurement and the steering wheel angle measurement. When these measurements correspond, the display unit will read "0.00" as shown in FIG. 2 and the steering wheel will be within a preselected tolerance of the clear vision position when the roadwheels are in a straight ahead position.

The steering wheel angle tool 34 and the wheel alignment unit 14 generate the respective signals on a continuous basis, meaning the measurements are made on a real time basis and the positions are continuously generated and fed into the processor 40. It has been determined that during the alignment process, the steering wheel 16 rotates when the toe angle is adjusted making it necessary to continuously measure the instantaneous position of the steering wheel in order to approximate a clear vision position more accurately than with prior art systems. The apparatus of the present invention dynamically determines the desired toe angle to match to the instantaneous position of the steering wheel deviation as will be explained with reference to the logic flow diagram of FIG. 4.

Figure 4:
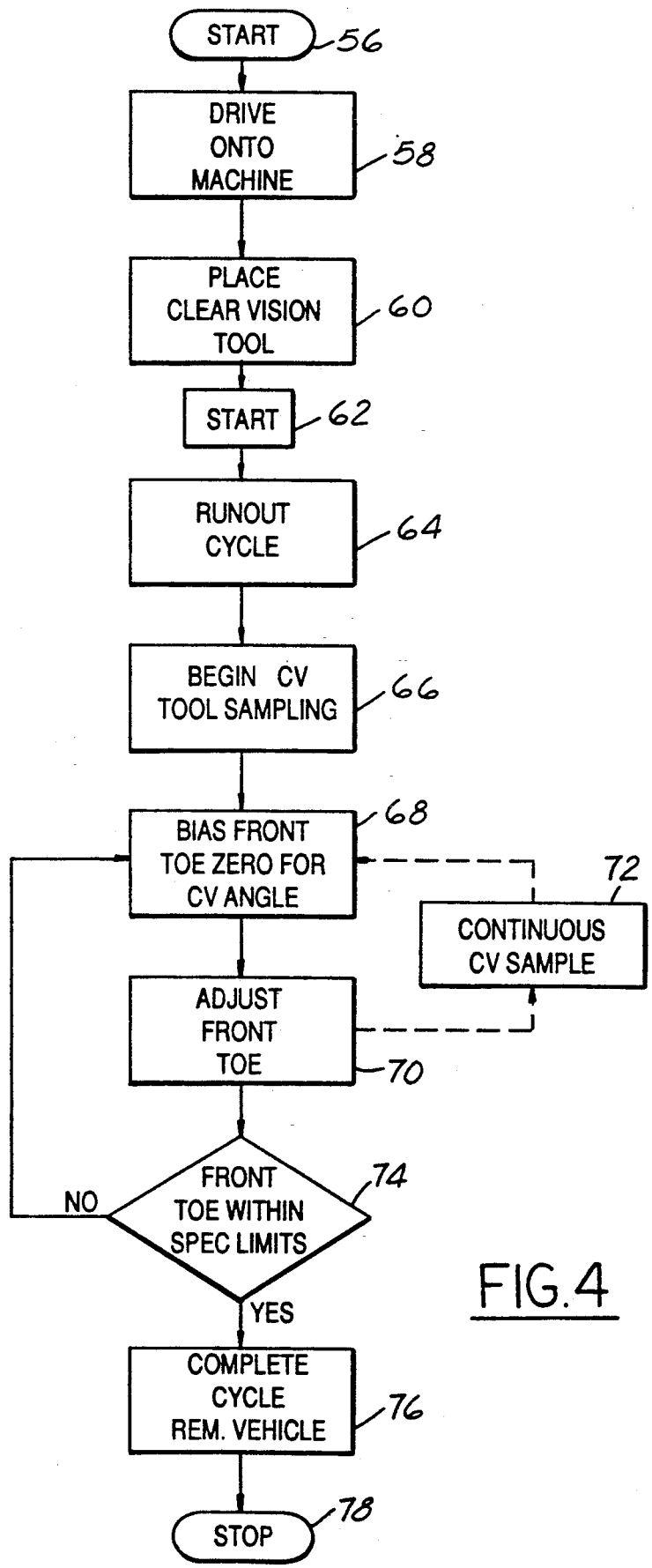
FIG. 4 is a logic flow block diagram of a method of the present invention.

Starting with block 58 of FIG. 4, the vehicle to be aligned is driven onto the wheel alignment unit 14 so that the front roadwheels 18 and rear roadwheels 20, respectively, are placed in the front rollers 22 and rear rollers 24. At block 60, the steering wheel angle measuring tool 34 is placed on the vehicle steering wheel 16. The steering wheel 16 rotates freely with respect to the vehicle chassis throughout the method of the present invention. After the tool is placed on the steering wheel the process begins at start block 62.

At block 64, a wheel runout cycle begins wherein the wheel runout measuring tools 26, 30, contact the inner and outer sidewalls of the front and rear vehicle roadwheels. The rollers 22 and 24 rotate the front and rear wheels approximately two turns and the transducers 28, 32, generate signals to the processor 40 which calculates a wheel runout value to be used in determining a desired toe angle set value. At block 66, the steering wheel angle measuring tool 34 generates signals corresponding to the instantaneous position of the steering wheel with respect to its vertical axis. At this point, if the steering wheel is at a position greater than +/−60 degrees from its vertical axis, the alignment unit assumes a +/−60 degree position and continues. At block 68, the desired toe angle values are determined for the measured, instantaneous steering wheel angle position as measured at block 66. The desired toe angle values are determined by the processor 40 according to the following:

$$T_l = TFTOE/2 + (CV_{act} - CV_{spec})/\text{Steering Ratio}$$

$$T_r = TFTOE/2 - (CV_{act} - CV_{spec})/\text{Steering Ratio}$$

wherein:

$T_l$ = desired left wheel toe angle;
$T_r$ = desired right wheel toe angle;
TF TOE = predetermined total front toe angle based upon manufacturers specifications;
$CV_{act}$ = measured steering angle deviation;
$CV_{spec}$ = predetermined steering wheel angle position with respect to its vertical axis based upon manufacturers specifications;
Steering Ratio = ratio of the angular distance the steering wheel rotates to the angular movement of said roadwheels. A typical steering ratio for a truck is approximately 19.5:1 and for a car is approximately 15:1.

At block 70, the toe angle of the vehicle is adjusted by an operator by known mechanical means such as by moving the tie rod adjusters in order to achieve a 0.00 reading on the display unit 38. While the toe adjusters are being manipulated, it often occurs that the steering wheel moves relative to its initial position due to the compliances between the roadwheel and the tierod, the tierods and the steering gear, and the steering gear and the steering shaft as explained above. Because of the movement of the steering wheel, block 72 indicates that a continuous steering wheel angle position measurement, CV, is taken. This measurement gives the continuous, instantaneous position of the steering wheel deviation from the steering wheel's vertical axis. This actual CV reading is incorporated into the above formula to again determine a desired toe value. This continuous computation done on a real time basis dynamically determines the desired toe angle corresponding to the instantaneous position of the steering wheel.

At decision block 74, the processor determines whether the front and rear toe is within the specified limits as determined by the vehicle manufacturer. If not, the method returns to block 68 to begin the calculation of the desired toe angle corresponding to the instantaneous position of the steering wheel again. If at block 74 the front toe is within the specified limits, at block 76 the operator tightens the toe adjusters and the vehicle is removed from the wheel alignment unit 14. At this point, when the roadwheels of the vehicle are in a straight ahead position, the steering wheel is in its clear vision position. If at the end of the alignment process, the steering wheel angle is greater than +/− 60 degrees from the steering wheel vertical axis in either direction, the steering wheel adjustment is assumed to be incorrect and the toe set process run again. By use of the methodology shown in FIG. 4, a continuous feedback loop between the steering wheel position and the toe angle positions of the vehicle is generated in the processor 40. The processor reads the steering wheel angle measurement on a continuous, real time basis and adjusts the desired toe set point to the instantaneous measured position of the steering wheel.

Based upon the above method, it should be readily apparent that the apparatus of the present invention may be utilized in a new car assembly plant to align the toe angle of the front and rear roadwheels of the vehicle to the instantaneous position of the steering wheel by utilizing generally the same steps as in the method described above. Furthermore, the apparatus may be utilized at service stations and other types of after-market facilities. The present invention is not meant to be limited solely to a new vehicle manufacturing environment and may be utilized in the after market as well.

It should be readily apparent to those skilled in the art that many other configurations and permutations of the present invention are readily available. For example, it should be apparent to those skilled in the art that the present invention could utilize a steering wheel angle measuring tool which emits a radio frequency signal such that the need for a cable interconnecting the processor and the tool is unnecessary. It is the following claims, including all equivalents which define the scope of the present invention.

What is claimed is:

1. An apparatus for positioning a steering wheel of a vehicle having a chassis and a set of roadwheels to within a preselected tolerance of a predetermined relationship of a spoke of said steering wheel to a vertical axis of said steering wheel, said predetermined relationship corresponding to a predetermined toe angle of said set of roadwheels, said apparatus comprising a steering wheel angle measuring means for measuring a deviation in the position of said steering wheel from said predetermined relationship and for generating a first signal corresponding to said deviation, said means being operative to rotate freely with respect to said vehicle chassis during measurement of said deviation.

2. An apparatus according to claim 1, further including:
   toe angle measuring means for continuously measuring the position of the toe angle of the roadwheels of said vehicle and for generating a second signal corresponding to said toe angle measurement; and
   processor means operatively associated with said steering wheel angle measuring means and said toe angle measuring means for receiving said first and second signals and for dynamically determining a desired toe angle of said roadwheels of said vehicle based upon said measured steering wheel deviation and for generating a third signal when said measured toe angle corresponds to said desired toe angle.

3. An apparatus according to claim 1, wherein said steering wheel angle measuring means comprises a transducer operative to measure continuously said deviation and generate said first signal.

4. An apparatus according to claim 1, wherein said toe angle measuring means comprises a transducer operative to measure said toe angle and generate said second signal.

5. An apparatus for positioning a steering wheel of a vehicle having a chassis and a set of roadwheels to within a preselected tolerance of a central neutral position, comprising:
   first means mounted on said steering wheel for continuously measuring a deviation in the position of said steering wheel from a vertical axis of said steering wheel and for generating a first signal corresponding to said deviation;
   second means for continuously measuring the position of the toe angle of the roadwheels of said vehicle and for generating a second signal corresponding to said toe angle measurement; and
   processor means operatively associated with said first and second measuring means for receiving said first and second signals and for dynamically determining a desired toe angle of said roadwheels of said vehicle based upon said measured steering wheel deviation and for generating a third signal when said measured toe angle corresponds to said desired toe angle.

6. An apparatus according to claim 5, wherein said first means is adapted to rotate freely with respect to said vehicle chassis during measurement of said deviation.

7. An apparatus according to claim 5, wherein said first means comprises a transducer operative to measure continuously said deviation and generate said first signal.

8. An apparatus according to claim 5, wherein said first means comprises an inclinometer.

9. An apparatus according to claim 5, wherein said first means comprises an electronic level.

10. An apparatus according to claim 5, wherein said steering wheel includes at least one spoke and said first means comprises a T-shaped member adapted to be mounted adjacent said at least one spoke of said steering wheel, said member including a pair of rollers disposed on opposite ends of a longitudinal arm thereof and adapted to engage said steering wheel.

11. An apparatus according to claim 10, wherein said member further includes a plunger disposed on a transverse arm of said member medial said pair of rollers, said plunger adapted to engage said steering wheel and including biasing means to securely fix said member to said steering wheel.

12. An apparatus according to claim 5, wherein said second means comprises a transducer operative to measure said toe angle and generate said second signal.

13. An apparatus according to claim 5, further including means for measuring runout of said vehicle set of roadwheels and for generating a fourth signal corresponding to said runout.

14. An apparatus according to claim 13, wherein said processor means is operative to receive said fourth signal and dynamically determine a desired toe angle of said roadwheels of said vehicle based upon said measured steering wheel deviation and said measured wheel runout.

15. An apparatus according to claim 5, wherein said processor means is operative dynamically determine said desired toe angle of said roadwheels of said vehicle based upon the formula:

$$T_l = TFTOE/2 + (CV_{act} - CV_{spec})/Steering\ Ratio$$

$$T_r = TFTOE/2 - (CV_{act} - CV_{spec})/Steering\ Ratio$$

wherein:

$T_l$ = desired left wheel toe angle;
$T_r$ = desired right wheel toe angle;
TF TOE = predetermined total front toe angle;
$CV_{act}$ = measured steering angle deviation;
$CV_{spec}$ = predetermined steering wheel angle position with respect to said vertical axis;
Steering Ratio = ratio of the angular distance said steering wheel rotates to the angular movement of said roadwheels.

16. An apparatus for aligning a set of roadwheels of a vehicle having a chassis and a steering wheel to within a preselected tolerance of the instantaneous position of said steering wheel, comprising:

first means for measuring the instantaneous position of a spoke of said steering to a vertical axis of said steering wheel and for generating a first signal corresponding to said position, said first means being operative to rotate freely with respect to said vehicle chassis during measurement of said position;

toe angle measuring means for continuously measuring the position of the toe angle of the roadwheels of said vehicle and for generating a second signal corresponding to said toe angle measurement; and processor means operatively associated with said first means and said toe angle measuring means for receiving said first and second signals and for dynamically determining a desired toe angle of said roadwheels of said vehicle based upon said instantaneous steering wheel position and for generating a third signal when said measured toe angle corresponds to said desired toe angle so that the instantaneous position of said steering wheel corresponds to the measured toe angle of said roadwheels of said vehicle.

17. A method of positioning a steering wheel of a vehicle having a chassis and a set of roadwheels to within a preselected tolerance of a central neutral position corresponding to a predetermined toe angle of said set of roadwheels, said method comprising the steps of:

continuously measuring a deviation in the position of said steering wheel from a vertical axis of said steering wheel as said steering wheel rotates freely with respect to said vehicle chassis and generating a first signal corresponding to said deviation;

continuously measuring the position of the toe angle of the roadwheels of said vehicle and generating a second signal corresponding to said toe angle measurement;

dynamically determining a desired toe angle of said roadwheels of said vehicle based upon said first and second signals and generating a third signal when said measured toe angle corresponds to said desired toe angle; and fixing said toe angle of said set of vehicle roadwheels upon generation of said third signal.

18. A method according to claim 17 further including the step of measuring runout of the set of vehicle roadwheels and generating a signal corresponding to said runout measurement.

19. A method of aligning a set of roadwheels of a vehicle having a chassis and a steering wheel operative to rotate freely with respect to said chassis to within a preselected tolerance of an instantaneous position of a spoke of said steering wheel, said method comprising the steps of:

continuously measuring said instantaneous position of said steering wheel as said steering wheel rotates freely with respect to said vehicle chassis and generating a first signal corresponding to said position;

continuously measuring the position of the toe angle of the roadwheels of said vehicle and generating a second signal corresponding to said toe angle measurement;

dynamically determining a desired toe angle of said roadwheels of said vehicle based upon said first and second signals and generating a third signal when said measured toe angle corresponds to said desired toe angle; and fixing said toe angle of said set of vehicle roadwheels upon generation of said third signal.

* * * * *